United States Patent [19]

St. Laurent, Jr.

[11] 4,253,675
[45] Mar. 3, 1981

[54] IMPROVEMENTS OF SEALED SHAFTS

[75] Inventor: Wilfred H. St. Laurent, Jr., Marblehead, Mass.

[73] Assignee: Bellofram Corporation, Burlington, Mass.

[21] Appl. No.: 90,366

[22] Filed: Nov. 1, 1979

Related U.S. Application Data

[62] Division of Ser. No. 3,163, Jan. 15, 1979, Pat. No. 4,208,060.

[51] Int. Cl.³ .................... F16J 3/04; F16J 15/56
[52] U.S. Cl. .................... 277/30; 277/212 FB; 74/18
[58] Field of Search ......... 277/30, 95, 212 R, 212 FB; 74/18, 18.2, 18.1

[56] References Cited

U.S. PATENT DOCUMENTS

| | | | |
|---|---|---|---|
| 1,151,227 | 8/1915 | Stokes | 277/212 R X |
| 1,712,003 | 5/1929 | Hubbard | 277/212 R X |
| 3,171,285 | 3/1965 | Tuft | 74/18.2 |
| 3,391,646 | 7/1968 | Schlosser | 74/18.2 X |

FOREIGN PATENT DOCUMENTS

| | | | |
|---|---|---|---|
| 1802780 | 9/1970 | Fed. Rep. of Germany | 74/18.2 |
| 2333432 | 1/1974 | Fed. Rep. of Germany | 277/212 FB |

Primary Examiner—Robert S. Ward, Jr.
Attorney, Agent, or Firm—Erwin Salzer

[57] ABSTRACT

A shaft sealing precluding fluid from moving in a direction longitudinally of the shaft. At the same time the shaft sealing allows a motion of the shaft in axial direction, an inclination of the shaft, and may also allow a rotary motion of the shaft relative to its sealing means. The sealing means is a rolling diaphragm including a clamping flange on one end of the rolling wall thereof. The other end of the rolling diaphragm is provided with a cylindrical elastomeric member having a projection conforming substantially with the shape of a portion of reduced diameter of the shaft and engaging under pressure said portion of reduced diameter. The rolling diaphragm includes an elastomeric ply and a fabric reinforcement of the ply. The fabric reinforcement is removed from a region of the aforementioned projection of said rolling diaphragm to provide an interface between said portion of reduced diameter of, or cavity in, said shaft and said projection where the radially inward pressure of said projection is not limited by the presence of said fabric reinforcement.

4 Claims, 2 Drawing Figures

SEALED SHAFTS

This is a division of application Ser. No. 003,163, filed Jan. 15, 1979, now U.S. Pat. No. 4,208,060.

BACKGROUND OF THE INVENTION

This invention provides a shaft seal which is less complex and less expensive than prior art shaft seals.

SUMMARY OF THE INVENTION

A sealed shaft according to the present invention includes a shaft having a coaxial annular portion of reduced diameter bounded by two portions of relatively large diameter and a rolling diaphragm having a rolling wall and attachment means to either end of said rolling wall. One of said attachment means includes a clamping flange for the radially outer end of said rolling diaphragm and the other of said attachment means for the radially inner end of said rolling diaphragm includes a substantially cylindrical member of an elastomeric substance, e.g. natural or synthetic rubber, arranged in coaxial relation to said shaft and surrounding said shaft and having an annular projection conforming substantially to the shape of said portion or reduced diameter of said shaft engaging said portion of reduced diameter of said shaft and exerting a radially inward pressure on said portion of reduced diameter or cavity of said shaft.

The rolling diaphragm includes an elastomeric ply and a fabric reinforcement thereof. The fabric reinforcement is removed, or trimmed off, from the region of the projection of the rolling diaphragm entering into the portion of reduced diameter, or into the cavity, of said shaft. The lack of a fabric reinforcement at this particular point allows a larger radially inward pressure of the projection of the rolling diaphragm than would be possible if the fabric reinforcement were not trimmed off at this particular point.

DESCRIPTION OF PREFERRED EMBODIMENTS

Figure 1:
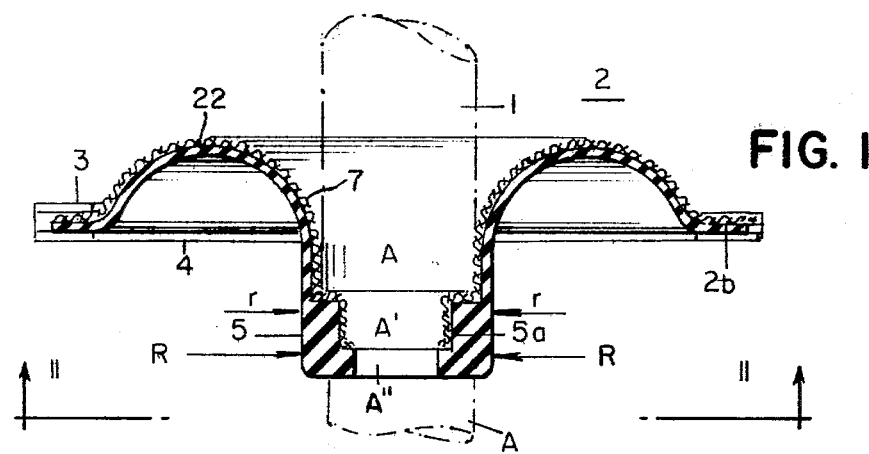
FIG. 1 shows in longitudinal section means for affixing the axially inner end of a rolling diaphragm to a rotatable shaft.

Referring now to the drawings, numeral 1 has been applied to indicate a shaft which may be rotatable or non-rotatable. As shown in FIG. 1, shaft comprises an upper portion A and a lower portion A having equal diameters and two intermediate portions A' and A" whose outer diameters are smaller than that of portions A. The outer diameter of portion A' is larger than that of portions A". Portions A' and A" form a cavity in the shaft. In other words, shaft 1 includes a graded groove A', A" which is bounded by planar surfaces. Numeral 2 has been applied to generally designate a rolling diaphragm including a rolling wall 2a and means for attaching both ends of said rolling wall. One of said attachment means, namely that for the radially outer end of its rolling wall 2a, includes a clamping flange 2b. The other attachment means, namely that for the radially inner end of rolling diaphragm 2, includes a substantially cylindrical member 5 of an elastomeric material arranged in coaxial relation to shaft 1 and surrounding shaft 1. As shown in FIG. 1, member 5 has an annular projection 5a conforming substantially to the shape of the portion of reduced diameter A of shaft 1 and engaging said portion of reduced diameter. This gives rise to strong forces in the direction of arrows r causing rolling diaphragm 2 to adhere to shaft 1. The structure of FIG. 1 has a tendency to increase these forces as indicated by arrows R, by virtue of the increased length and the grading of elastomeric portion 5.

Figure 2:
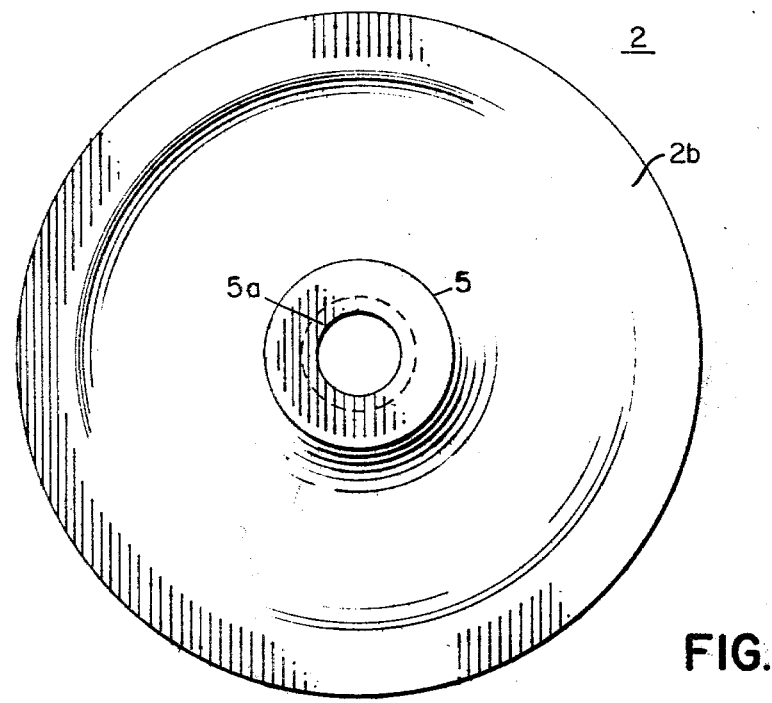
FIG. 2 shows a section along II—II of FIG. 1.

It will be apparent from FIGS. 2 and 3 that shaft 1 is allowed by rolling diaphragm to move forewardly and rearwardly in axial direction. Rolling diaphragm 1 allows also small inclinations of shaft 1. If the elastic member 5 exerts relatively little pressure upon shaft 1 member 5 forms a bearing for shaft 1 allowing a relative rotary motion between shaft 1 and elastomeric member 5.

Elastomeric member 5 and rolling diaphragm 2 including its rolling wall 2a and its radially outer clamping flange 2b may consist of a unitary piece of an elastomeric material.

According to FIG. 1 rolling diaphragm 2 includes, in addition to an elastomeric ply, a fabric reinforcement 7. Fabric reinforcement 7 does not extend to the surface coextensive with shaft portion A" of elastomeric member 5. In other words, fabric reinforcement 7 is trimmed out at the region thereof coextensive with the surface of the portion of reduced diameter A of shaft 1. This imparts increased flexibility to the axially outer end of elastomeric member 5 and thus avoids wicking, i.e. formation of a leakage path along the interface between parts A" and the axially outer end of part 5.

As shown in more detail in the parent application, now U.S. Pat. No. 4,208,060, issued June 17, 1980, shaft 1 may not include portion A" but merely comprise portions A;A' and A. In such instance the fabric reinforcement 7 may be trimmed off at a portion of the interface between projection 5 and shaft portion A'. The radially outer ends of diaphragm 2 may be clamped between plates 3 and 4.

I claim:

1. A sealed shaft comprising in combination
   (a) a shaft having a pair of axially outer portions of relatively large outer diameter and a contiguous axially inner portion of relatively small diameter, said axially inner portion defining an annular cavity in said shaft;
   (b) a rolling diaphragm including an elastomeric ply and a fabric reinforcement of said ply, said rolling diaphragm having a convoluted rolling wall and attachment means on both ends of said rolling wall;
   (c) one of said attachment means including a clamping flange on the radially outer end of said rolling diaphragm;
   (d) the other of said attachment means on the radially inner end of said rolling diaphragm comprising an elastomeric sleeve arranged in coaxial relation to and surrounding said shaft and including an annular projection projecting into said cavity and conforming to the shape thereof, said projection exerting a radially inward pressure on said portion of said shaft of relatively small diameter; and
   (e) said fabric reinforcement being removed from a region of said annular projection to provide an interface between said cavity in said shaft and said projection where the radially inward pressure of said projection is not limited by the presence of said fabric reinforcement.

2. A sealed shaft as specified in claim 1 wherein said cavity in said shaft and said projection on the radially inner end of said rolling diaphragm are graded and wherein said fabric reinforcement is trimmed out in the portion of said projection where its inner diameter is narrowest.

3. An elastomeric rolling diaphragm for the passage of a shaft from one of a pair of spaces to another wherein a different pressure prevails, said rolling diaphragm comprising (a) a rolling wall having a clamping flange on the radially outer end thereof;

(b) the radially inner end of said rolling wall being thicker than said rolling wall proper and forming an annular radially inward directed projection adapted to enter into and to conform to an annular cavity in a shaft and to exert a radially inward pressure against a fixed point of said shaft; and (c) said radially outer end of said rolling diaphragm and said rolling wall thereof having a fabric reinforcement, but at least a portion of said annular radially inward directed projection being free of said fabric reinforcement to increase the resiliency thereof.

4. An elastomeric rolling diaphragm as specified in claim 3 wherein said radially inward projection is graded to fit into a graded cavity in said shaft and said fabric reinforcement is trimmed out only in the region of said projection where the inner diameter thereof is smallest.

* * * * *